United States Patent [19]
Sudo

[11] Patent Number: 5,905,964
[45] Date of Patent: May 18, 1999

[54] PORTABLE COMMUNICATION APPARATUS

[75] Inventor: Fukuharu Sudo, Tokyo, Japan

[73] Assignee: Sony Corporation, Tokyo, Japan

[21] Appl. No.: 08/803,750

[22] Filed: Feb. 21, 1997

[30]     Foreign Application Priority Data

Feb. 26, 1996 [JP] Japan .................................. 8-065376

[51] Int. Cl.⁶ .............................. H04Q 7/20; H04M 1/00
[52] U.S. Cl. ...................... 455/566; 379/93.23; 455/403
[58] Field of Search ................................ 455/566, 170.1,
455/171.1, 154.2, 403; 379/93.23, 93.27,
201, 207; 345/145, 352, 353, 354, 146,
348, 349

[56]              References Cited

U.S. PATENT DOCUMENTS 4,994,908  2/1991  Kuban et al. ............................ 455/5.1
5,001,554  3/1991  Johnson et al. ........................ 455/26.1
5,303,288  4/1994  Duffy et al. ............................... 379/59
5,596,699  1/1997  Driskell ................................... 345/352
5,715,311  2/1998  Sudo et al. ............................... 455/403

*Primary Examiner*—Dwayne D. Bost
*Assistant Examiner*—Jean A. Gelin
*Attorney, Agent, or Firm*—Jay H. Maioli

[57]              ABSTRACT

A portable communication apparatus which can provide a short cut function with improved useability is provided. When numerical or literal information is input to cause a cursor to move at a jump, a display displays the input numerical or literal information, thereby enabling the user to confirm whether or not the input information has been accepted and to determine that the apparatus is in a short cut mode in which the cursor is moved at a jump. Therefore, a portable communication apparatus providing a short cut function with improved useability can be obtained.

7 Claims, 7 Drawing Sheets

↓ DOWN

↓ DOWN

↓ "7" KEY IS PRESSED

↓ "7" KEY IS PRESSED PRIOR TO TIME OUT

↓ TIME OUT

↓ SEND KEY IS PRESSED

TRANSMISSION IS INITIATED

PORTABLE COMMUNICATION APPARATUS

BACKGROUND OF THE INVENTION

1. Field of the Invention

This invention relates to a portable communication apparatus, and more particularly, is suitably applied to a portable telephone apparatus which calls using a telephone directory.

2. Description of the Related Art

Conventional portable telephone apparatuses are provided with telephone directory function for registering telephone numbers using names as keywords so that, at calling, the desired telephone number can be automatically called by reading the registered telephone directory and then specifying the destination. This eliminates the need for users to memorize telephone numbers improving useability.

However, conventional portable telephone apparatuses can display only two lines on a liquid crystal display provided as a display means and cannot show the overall telephone directory at a time. Thus, in such portable telephone apparatuses, a scroll key is operated to scroll the telephone directory. In this case, if the telephone directory has a large number of items, it takes a lot of time to reach the desired item. To avoid this problem, conventional portable apparatuses enable a short cut in which when any of the numbers allotted to respective items (hereafter, referred to as an item number) is input, the display is jumped to that item number skipping the intermediate display. This allows the user to view the desired item immediately without sequentially scrolling the telephone directory.

However, If the user does not know such a short cut function, when the user inadvertently presses a numerical key regarded as the item number while the telephone directory is being displayed, the screen is suddenly switched and the user does not know what is happening. This makes the portable telephone apparatus cumbersome to the user.

In addition, the short cut function has a time limit according to a timer for the acceptance of numerical keys, so that an input number can be accepted while the timer is effective, and then a screen jumps to that number. However, If the input number has not been accepted due to the timer, an unexpected screen is displayed.

For example, the case where a jump is made to the item number "12" will be considered. If "1" and "2" have been pressed while the timer is effective, the portable telephone apparatus determines that "12" has been input and normally jumps to the item number "12". On the other hand, if there is a long interval of time between "1" and "2" and the timer has terminated during the interval, the portable telephone apparatus determines that "1" and "2" have been separately input and jumps to the item number "2". In this case, since the desired screen is not displayed, the user has to input the item number "12" again.

As described above, in conventional portable telephone apparatuses, when the short cut function is used, the user does not know that the input number has been normally accepted. Thus, such portable telephone apparatuses are still lacking in terms of useability.

SUMMARY OF THE INVENTION

In view of the foregoing, an object of this invention is to provide a portable communication apparatus which can provide a short cut function with improved useability.

The foregoing object and other objects of the invention have been achieved by the provision of a portable communication apparatus wherein, when a numerical or literal information is input by an input means during displaying a plurality of items, the input numerical or literal information is displayed on a display means, and then the item corresponding to the input numerical or literal information is displayed on the display means and a cursor is displayed on the position of the corresponding item.

Since the display means displays the input numerical or literal information in this manner, the user can view the display to confirm whether or not the input has been normally accepted. In addition, by viewing the display, the user knows that the apparatus is in a short cut mode in which a cursor jumps to a position of a desired item.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
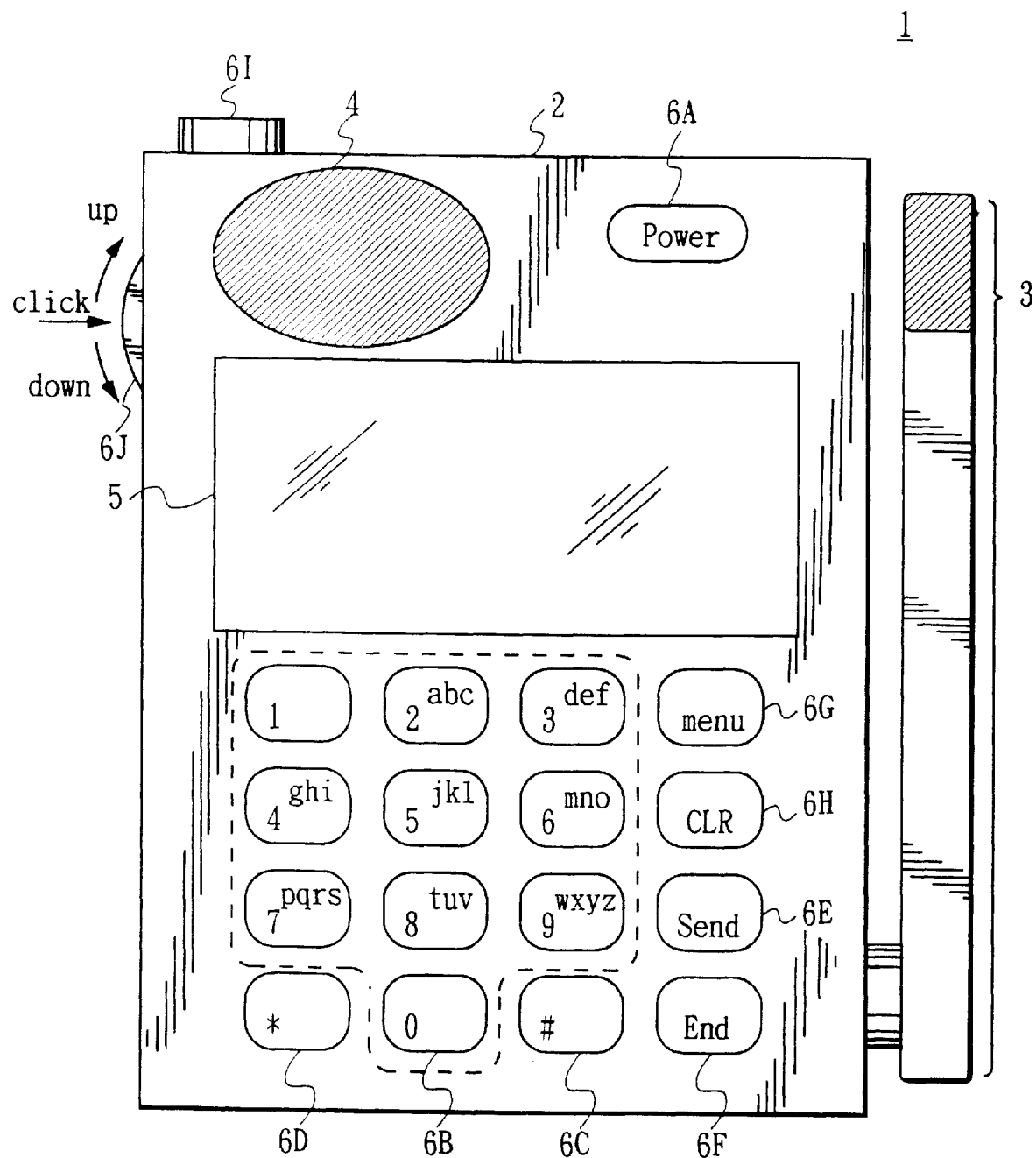
FIG. 1 is a schematic diagram showing the overall configuration of a portable telephone apparatus according to one embodiment of the present invention.
Figure 2:
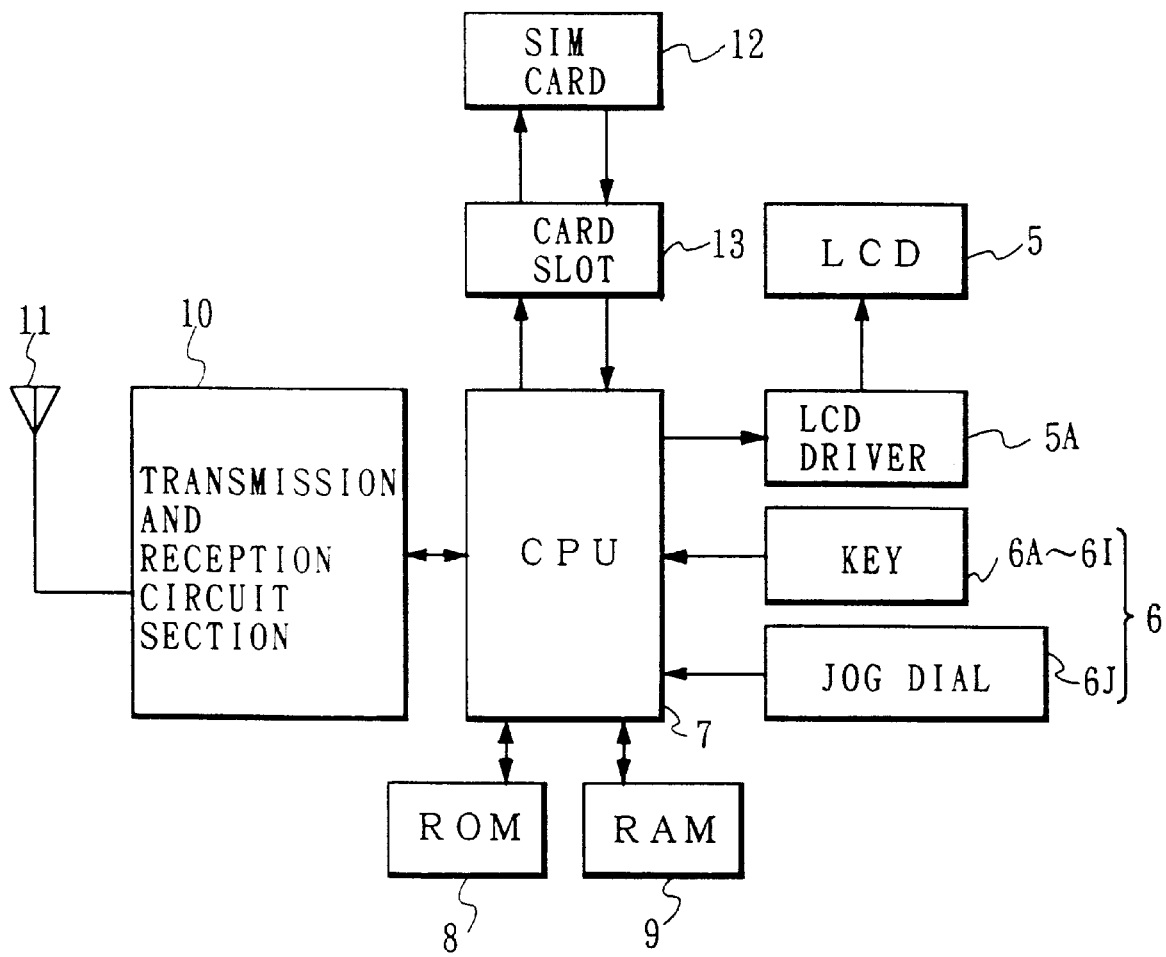
FIG. 2 is a block diagram showing the configuration of a circuit provided inside the portable telephone apparatus.

Preferred embodiments of this invention will be described with reference to the accompanying drawings:

First, the overall configuration of a portable telephone apparatus 1 and the configuration of its circuit will be described with reference to FIGS. 1 and 2. The portable telephone apparatus 1 is roughly composed of an apparatus main body 2 and an arm microphone 3 which is attached to the side of the main body so as to be freely rotated (opened and closed). Thus, while the apparatus is not in use, the arm microphone 3 can be closed to further reduce the size of the portable telephone apparatus 1.

In addition to a function for controlling on-hook or off-hook in response to an opening or closing operation, the arm microphone 3 has a function for disabling the operations other than those of specific keys in a closed state (hereafter, referred to as a key lock function). The key lock condition can be canceled by opening the arm microphone 3.

Such key lock function prevents operation keys from being inadvertently pressed to start malfunction while the portable telephone apparatus 1 is put in a pocket or a bag.

On the other hand, the apparatus main body 2 has various operation keys and a signal processing circuit. A speaker 4 paired with the arm microphone 3, a liquid crystal display (LCD) 5, and a plurality of operation keys 6 to which various functions are assigned are provided on the surface of the apparatus main body 2. And a central processing unit (CPU) 7 that uses these devices as I/O devices is built into the main body.

The CPU 7 controls the liquid crystal display 5 via a liquid crystal display driver 5A to display information according to an instruction input from operation keys 6 in a font of an appropriate size. The CPU 7 also controls a transmission and reception circuit section 10 to transmit and receive information to and from a base station apparatus via an antenna 11 connected to the section 10. The CPU 7 operates based on programs stored in a read only memory (ROM) 8 and data read into a random access memory (RAM) 9.

A card socket 13 is connected to the CPU 7, and the management information on subscribers is read from a subscriber ID card 12 (in this embodiment, a subscriber identity module (SIM) card) inserted into the card socket in order to provide control.

The liquid crystal display 5 comprises a matrix of pixels having, for example, 32×97 dots, and these dots can be used to display information in two types of fonts. One of the fonts is a small font that displays one character in, for example, 7×5 dots, while the other is a large font that displays one character in, for example, 15×8 dots. Thus, the use of the small font enables 4×16 characters to be displayed, while the use of the large font enables 2×10 characters to be displayed.

Basically, the large font is used to show characters input by the user, while the small font is used to display messages from the apparatus. However, if the number of characters input by the user exceeds a predetermined value (for example, 20), the font is automatically switched from the large font to the small font.

Since such a font switching function enables large characters to be input with the contents of input confirmed while the number of input characters is small, thereby incorrect inputs can be reduced. In addition, if the number of input characters is large, the input information on the same item can be checked on a single screen, and the contents of input can be understood easily.

Next, the operation keys 6 provided on the apparatus main body 2 will be described. According to this embodiment, the operation keys 6 comprises ten keys: a power supply key 6A, numerical keys 6B "0" to "9", a "#" key 6C, a "*" key 6D, a send key 6E, an end key 6F, a menu key 6G, a clear key 6H, a recording key 6I, and a jog dial 6J. The operation keys 6A to 6H are disposed on the front surface of the main body 2, whereas the remaining two operation keys 6I and 6J are disposed on the sides of the main body 2.

Main functions assigned to each operation key will be described below. The power supply key 6A is a toggle key for supplying power to an internal circuit in the apparatus main body 2. When this key is pressed once, the power is turned on. And when it is pressed twice, the power is turned off. However, if the user has pressed the power supply key 6A to turn the power on but has not input his or her personal ID number (PIN) for thirty seconds, the CPU 7 detects this to automatically turn the power off. This prevents the power from remaining turned on due to malfunction.

Next, the ten numerical keys 6B will be described. These ten numerical keys 6B are used to input not only numbers but also letters. According to this embodiment, a plurality of letters are assigned to each of the eight numerical keys "2" to "9" excluding "0" and "1" keys, thereby enabling letters to be input. For example, "a" to "c" are assigned to the "2" key, "d" to "f" are assigned to the "3" key, and "g" to "z" are respectively assigned to the other keys in a similar way.

In the case of inputting letters, the same key is pressed once, the first letter can be input. The same key is pressed twice, the second letter can be input, and the same key is pressed three times, the third letter can be input. The numerical keys 6B can also be used to select a display item. In addition, when a predetermined number is pressed while the telephone directory is being displayed, the screen can be switched to the position of the item corresponding to that number and the cursor display can be also moved to that item (a short cut function).

The send key 6E is used to input an operation initiation instruction in calling a telephone number, manually input with the numerical keys 6B, or a desired telephone number, selected from the telephone directory screen. In addition, the send key 6E is used to call the history of past dials.

The end key 6F is used to input a speech end instruction. The speech end can also be instructed by closing the arm microphone 3.

The menu key 6G is used to switch the screen, displayed on the liquid crystal display 5, between an initial screen and a menu screen. The portable telephone apparatus 1 normally displays time and so on as the initial screen, and when the menu key 6G is then pressed, the display can be switched to a menu screen displaying various setting items. Further, when the jog dial 6J described below is then used to perform a predetermined operation, the menu screens can be sequentially switched as if pages were turned.

In addition, when the menu key 6H is pressed while the menu screen is being displayed, the display can immediately return to the initial screen that was being displayed.

The menu key 6G is assigned a function as the only key that can cancel the key lock condition. That is, as described above, while the arm microphone 3 is closed, the apparatus is normally in the key lock condition, but pressing the menu key 6G enables the key lock condition to be ended to transfer to a key active condition.

The recording key 6I is used to record conversations and to reproduce the recorded conversations and is mounted near the jog dial 6J, that is, on the top surface of the apparatus main body 2 opposite to the arm microphone 3 so as to be operated by the user's hand holding the main body 2.

Finally, the jog dial 6J that has a central function within the ten operation keys will be described. The jog dial 6J is provided in the upper part of the side of the main body 2 opposite to the arm microphone 3 and near the speaker 4, and can be operated by the user's hand holding the apparatus main body 2 just as the recording key 6I.

Figure 3:
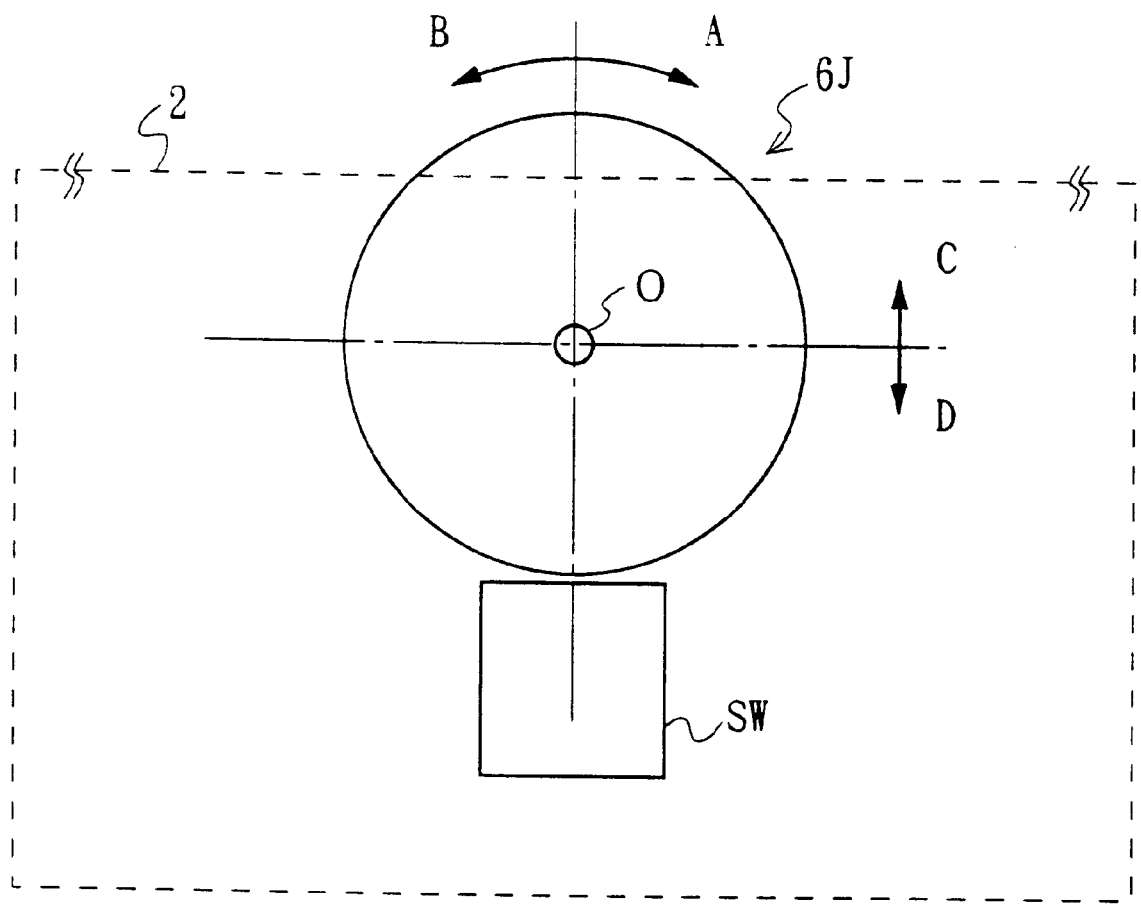
FIG. 3 is a schematic diagram generally showing the mechanism of a jog dial.

The jog dial 6J can be operated independently in the circumferential direction and the radial direction, and, as shown in FIG. 3, comprises a disc-like member (constituting a rotary encoder) that rotates around a rotation shaft O in the circumferential direction (as shown by the arrows A and B), a slide plate (not shown) that can slide in the radial direction (as shown by the arrows C and D), and a slide switch SW.

The slide plate and the slide switch SW are urged in the direction shown by the arrow C. The rotation shaft O is fixed to the slide plate so that if the jog dial 6J is pressed in the direction shown by the arrow D, the rotary encoder can slide integrally with the slide plate to press the slide switch SW in order to turn the switch on. The CPU 7 determines whether or not the jog dial 6J has been clicked by detecting whether the slide switch SW is turned on or off.

Figure 4B:
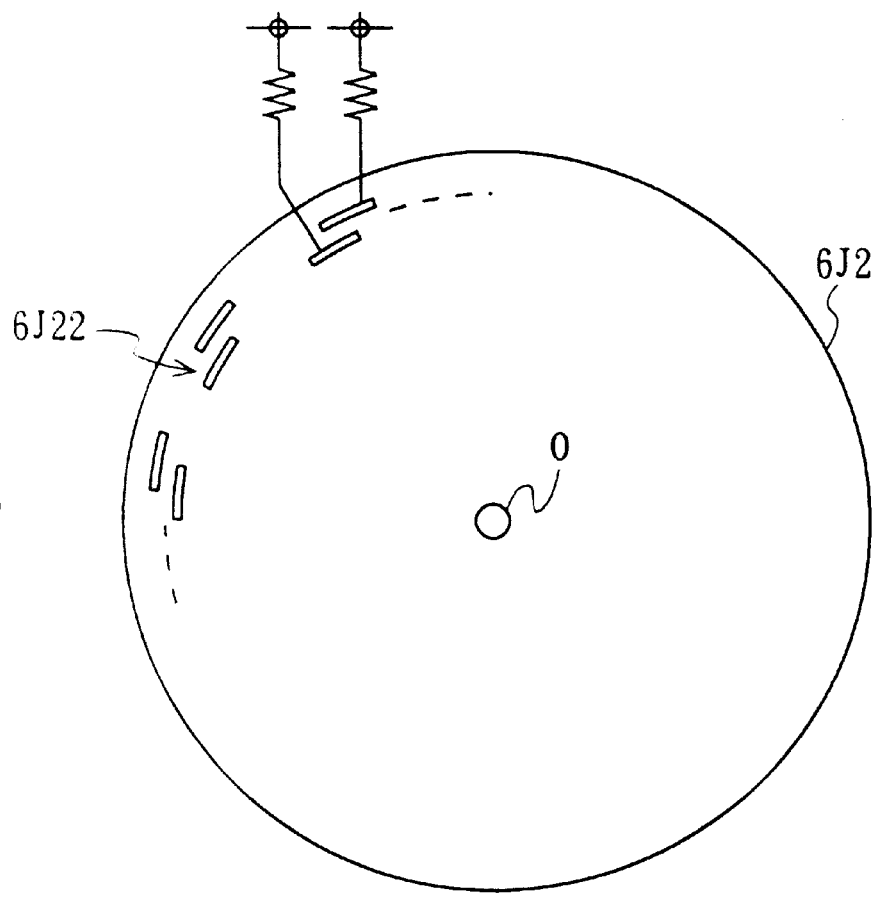
FIGS. 4A and 4B are schematic diagrams showing the configuration of a rotary encoder.
Figure 4A:
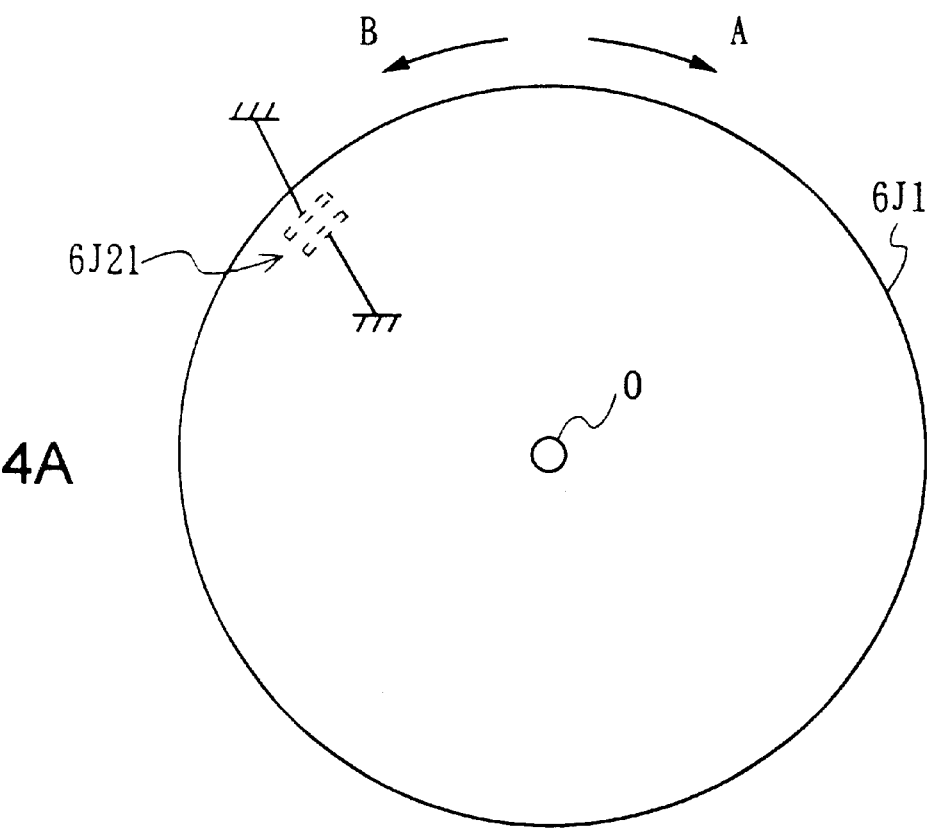

The rotary encoder that slides integrally with the slide plate comprises two discs 6J1 and 6J2, as shown in FIGS. 4A and 4B. The disc 6J1 is a movable member laminated on the top surface of the disc 6J2, and is mounted so as to rotate relative to the disc 6J2 fixed to the slide plate. The movable disc 6J1 has a pair of opposite electrodes 6J21. When assembled, the opposite electrodes 6J21 slidably contact twenty pairs of opposite electrodes 6J22 provided along the circumference of the disc 6J2. The opposite electrodes 6J22 provided on the fixed disc 6J2, which are disposed on the inner and outer circumferential sides, respectively, are slightly offset from each other.

Figure 5A:
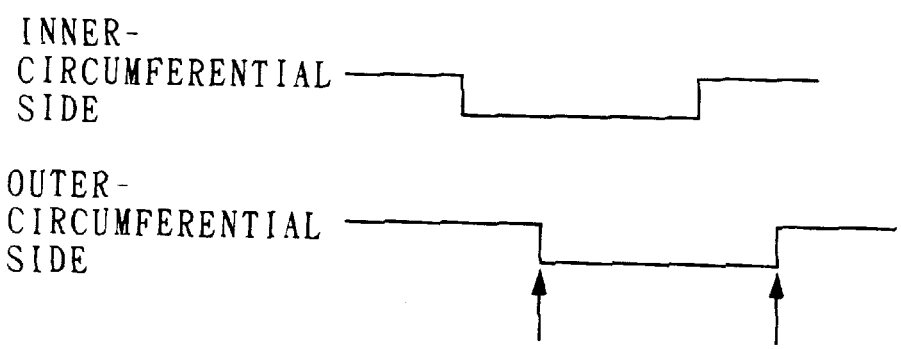
FIGS. 5A to 5B are diagrams showing waveforms output from the rotary encoder.
Figure 5B:
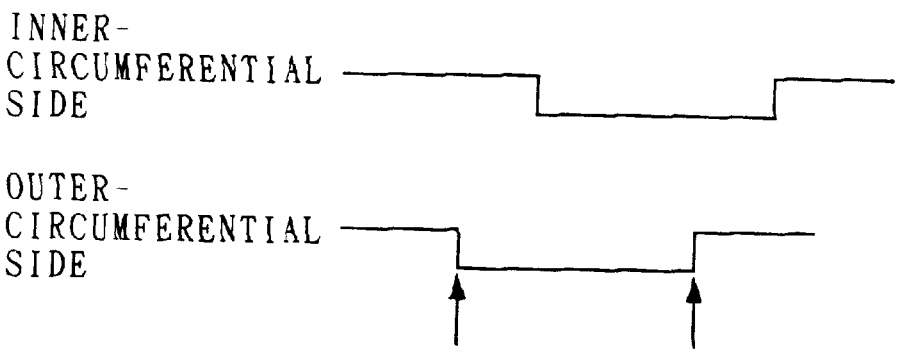

Thus, when the jog dial 6J is rotated in the direction shown by the arrow A, the potential output from the inner-circumferential opposite electrode 6J22 first falls down to the ground potential, as shown in FIG. 5A. On the contrary, when the jog dial 6J is rotated in the direction shown by the arrow B, the potential output from the outer-circumferential opposite electrode 6J22 first falls down to the ground potential, as shown in FIG. 5B. Using this nature, the rotational direction of the jog dial 6J is detected by detecting which of the inner- and outer-circumferential potential first falls. In this example, the number of rotations of the jog dial 6J is detected by counting the number of pulses output from the outer-circumferential electrode.

Next, a typical example of operation using the jog dial 6J will be described. While various list screens are being displayed on the liquid crystal display 5, the jog dial 6J can be circumferentially moved upward or downward to move upward or downward the cursor displayed on the liquid crystal display 5. In this state, When the jog dial 6J is pressed (hereafter referred to as "clicking") in the radial direction, the CPU 7 can be instructed to read detailed information on the item on which the cursor is located.

In addition, by circumferentially rotating the jog dial 6J during a speech, the volume of received sound can be adjusted. In addition, clicking the jog dial 6J during a speech enables muting.

The portable telephone apparatus 1 has various calling methods using a telephone directory, a radial function, the direct input of a telephone number, or a short dial number function. Here, the calling method using the telephone directory will be explained below.

Figure 6A:
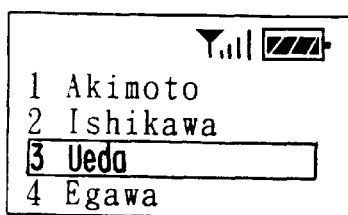
FIGS. 6A to 6F are schematic diagrams showing the screen of a liquid crystal display displayed when a short cut mode is used to make a call from a telephone directory.

While the arm microphone 3 is opened, while an external microphone is connected to the main body 2, or while a hands free kit is connected to the main body 2, when the jog dial 6J is clicked, a telephone directory shown in FIG. 6A is displayed on the liquid crystal display 5.

As is apparent from the figure, the telephone directory comprises item numbers each consisting of a combination of the numerals and the names of the people registered with the item numbers, and is normally displayed in the ascending order of the item number.

When the telephone directory is first displayed, the cursor the portion inversely displayed in black and white) is located at the top of the screen, that is, on the item number "1". When the jog dial 6J is then rotated downward, the cursor is sequentially moved downward to "2", then to "3", and so on. Conversely, when the jog dial 6J is then rotated upward, the cursor is sequentially moved upward. For example, FIG. 6A shows that the cursor has been moved to the item number "3" by rotating the jog dial 6J downward.

Figure 6B:
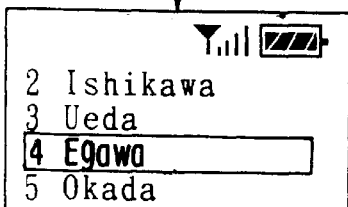
Figure 6C:
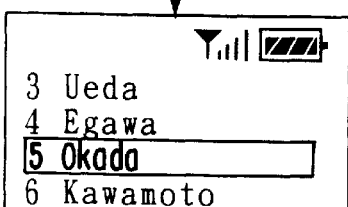

When the jog dial 6J is then further rotated downward, the cursor remains located on the same position (that is, third line from the top). However, the displayed telephone directory is shifted upward one line, so the cursor moves to the item number "4" as shown in FIG. 6B. When the jog dial 6J is then further rotated downward, the displayed telephone directory is shifted upward one line, so that the cursor moves to the item number "5" as shown in FIG. 6C. In this manner, when the jog dial 6J is rotated downward while the cursor is located on the third line of the screen, the telephone directory is sequentially shifted upward to move the cursor downward within the telephone directory.

When the jog dial 6J is rotated upward while the cursor is located on the second line of the screen, the telephone directory is sequentially shifted downward to move the cursor upward within the telephone directory.

When an item number is input using the numerical keys while the telephone directory is being displayed, the portable telephone apparatus 1 performs a short cut operation in which the cursor jumps to that item number (that is, short cut function). In this case, the portable telephone apparatus 1 displays the input item number on the liquid crystal display 5, thereby enabling the user to view the display to confirm whether or not the input item number has been normally accepted.

An operation for causing a jump to, for example, the item number "77" will be described. When the numerical key 6B corresponding to "7" is pressed while the telephone directory is being displayed as shown in FIG. 6C, the screen displayed on the liquid crystal display 5 is switched to a short cut mode screen shown in FIG. 6D, and then the input number "7" is displayed. In this case, the letters "Jump to" representing the short cut mode are displayed in the small font at the top of the screen, and the input number "7" is displayed in the large font at the bottom of the screen. Further, an undercursor ""indicating that the apparatus is ready to accept the subsequent number is displayed following the input number "7".

A timer (for example, about one second) is set for accepting the subsequent number, so that an input number is accepted before the timeout of the timer. The undercursor described above indicates that the timer has not terminated and that the apparatus is ready to accept the subsequent number.

Figure 6D:
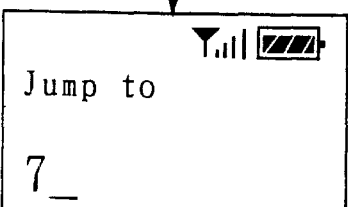
Figure 6E:
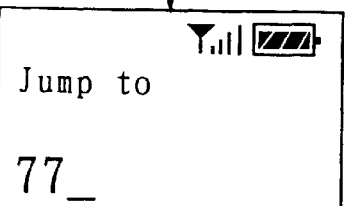

When the numerical key 6B corresponding to "7" is subsequently pressed while the apparatus is ready to accept the subsequent number, this subsequently input number "7" is displayed also in the large font following the initially input number "7", as shown in FIG. 6E.

Figure 6F:
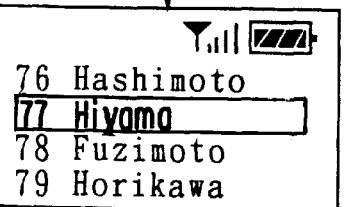

When the timer described above has terminated, the acceptance of input is ended, and the portion of the telephone directory around the specified item number "77" is displayed as shown in FIG. 6F. At this point, the specified item number "77" is displayed on the second line of the screen with the cursor shown on the item number "77".

If there is nothing in the telephone directory which corresponds to the input item number, an error is displayed, and the screen displayed prior to the entry into the short cut mode (in this case, the screen shown in FIG. 6C) appears and returns to the initial.

When the item number "77" is input to move the cursor to this item number as described above and then the send key 6E is pressed, the portable telephone apparatus 1 automatically initiates calling "Mr. Hiyama" registered with the item number "77" (that is, dialing the registered telephone number of "Mr. Hiyama"). When the telephone directory is displayed and the cursor is then placed on the desired destination and the send key 6E is pressed in this manner, the portable telephone apparatus 1 automatically calls the destination.

Figure 7:
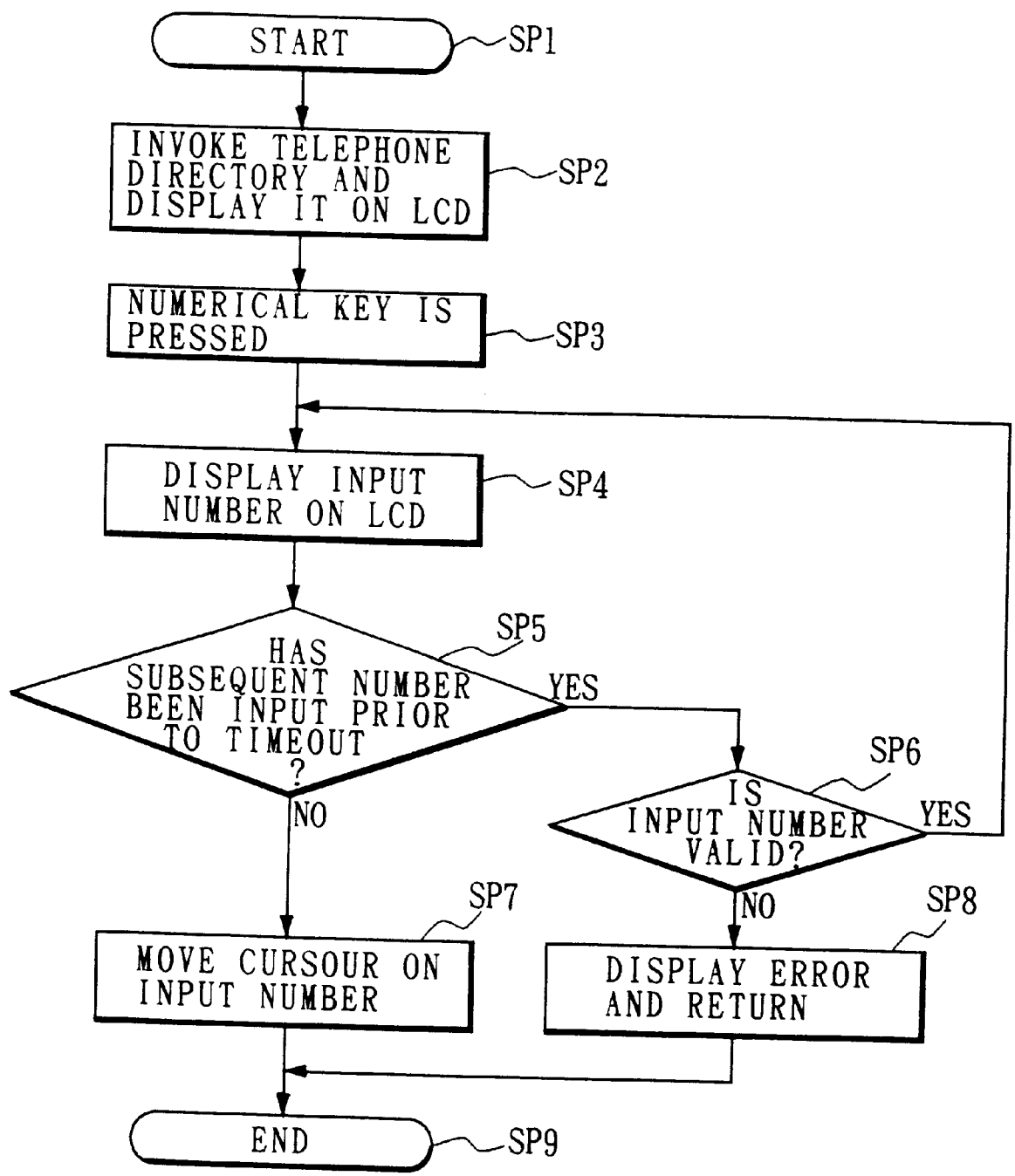
FIG. 7 is a flowchart showing a processing procedure of the short cut mode.

The short cut mode described above is operated by the display control of the CPU 7, and the processing procedure of the short cut will be described with reference to the flowchart shown in FIG. 7.

At step SP2 subsequent to step SP1, when the user operates the apparatus to display the telephone directory as described above, the CPU 7 detects this and reads the telephone directory, for example, from the RAM 9 to display it on the liquid crystal display 5.

At the subsequent step SP3, when the user operates the numerical keys 6B to input a number, the CPU 7 detects this and proceeds to the subsequent step SP4. At step SP4, the CPU 7 displays on the liquid crystal display 5 the short cut mode screen described above and also shows the input number on the liquid crystal display 5 (see FIG. 6D).

At the subsequent step SP5, the CPU 7 activates the predetermined timer and determines whether or not another number is subsequently input. If the subsequent number has been input before the timer has terminated, the CPU 7 proceeds to step SP6, and otherwise, the CPU 7 proceeds to step SP7.

At step SP6, the CPU 7 determines whether or not the input number is valid (that is, whether or not there is anything in the telephone directory which corresponds to the input item number. If the input number is valid, the CPU 7 returns to step SP4 to repeat the processing, and otherwise, the CPU 7 proceeds to step SP8.

If the CPU 7 has proceeded to step SP7 due to the absence of input until the timeout of the timer, it displays the portion of the telephone directory around the item number corresponding to the input number on the liquid crystal display 5, and displays the cursor on the input item number.

If the CPU 7 has proceeded to step SP8 due to the invalidity of the input number, it displays an error and then returns to the telephone directory screen displayed prior to the entry into the short cut mode.

After finishing the operation of step SP7 or SP8 in this manner, the CPU 7 proceeds to the subsequent step SP9 to finish the processing procedure of the short cut mode.

According to the above configuration, if the telephone directory is used to make a call, and when an item number is input using the numerical keys 6B while the telephone directory is being displayed, the portable telephone apparatus 1 can move the cursor to the input item number at a jump. When the destination is selected by moving the cursor in this manner and the send key 6E is then pressed, the portable telephone apparatus 1 can automatically call the destination.

When an item number is input to move the cursor at a jump, the portable telephone apparatus 1 displays the input item number on the liquid crystal display 5. This enables the user to view the display to confirm whether or not the input item number has been accepted. In this case, the letters "Jump to" indicating the short cut mode are displayed on the screen, thereby the user can know that the portable telephone apparatus 1 is currently in the short cut mode.

According to the aforementioned configuration, the item number input by the user in the short cut mode is displayed on the liquid crystal display 5, thereby the user knows whether or not the input item number has been input. And the useability of this apparatus is improved. Thus, a short cut function with improved useability can be provided to users.

Next, the other embodiments will be described.

While in the aforesaid embodiment, an item number is input to cause the cursor to move at a jump, however, the present invention is not limited thereto and the initial letter (e.g., alphabet) of any registered name can be input to cause the cursor to move to the corresponding position at a jump. In this case, the input letter is displayed on the liquid crystal display 5 as with the aforesaid embodiment, thereby the user can know whether or not the input letter has been normally accepted. Thus the useability can be improved.

Further, while in the aforesaid embodiment, the undercursor is displayed to clearly indicate that the apparatus is ready to accept the subsequent letter, however, the present invention is not limited thereto and any other letter or symbol can be displayed to clearly indicate that the apparatus is ready to accept the subsequent letter. In other words, similar effects can be obtained as long as the apparatus displays something indicating that it is ready to accept the subsequent letter.

In addition, the value of the timer can be displayed to show the remaining time. In this case, the time can be expressed by numbers, a pictograph, or a symbol (for example, in a bar chart). In this case, in the flowchart shown in FIG. 7, a step for displaying the time on the timer may be added after step SP4. Displaying the time on the timer in this manner can urge the user to input the subsequent letter, thereby further improving useability.

Further, while in the aforesaid embodiment, the screen returns to the preceding screen (FIG. 6C) if there is nothing in the telephone directory which corresponds to the input item number, however, the present invention is not limited thereto and the screen can return to the initial screen of telephone directory (FIG. 6A) or to the initial screen of the short cut mode (FIG. 6D).

Further, while in the aforesaid embodiment, only the input item number is displayed, however, the present invention is not limited thereto and the information on the item corresponding to the input item number can be displayed. For example, in FIG. 6E, "Hiyama", "Hiy . . . ", or the telephone number "03-34X . . . " that corresponds to the input item number "77" can be displayed between the item number "77" and the display of "Jump to". This enables the user to confirm whether or not the cursor may be really moved to the input item number "77".

Further, while in the aforesaid embodiment, the letters "Jump to" are displayed to clearly show that the apparatus is in the short cut mode, however, the present invention is not limited thereto and other letters, symbols, or numbers can be displayed to clearly show that the apparatus is in the short cut mode. In other words, similar effects can be obtained as long as the display indicates the short cut mode.

Further, while in the aforesaid embodiment, the item number input while the telephone directory was being displayed is displayed and the cursor is then moved to the corresponding position at a jump, however, the present invention is not limited thereto and the letter input while a menu list or other item list was being displayed can be displayed and the cursor can then be moved to the corresponding position at a jump. In other words, similar effects can be obtained as long as the letter input while an item list was being shown is displayed.

Further, while in the aforesaid embodiment, the CPU 7 controls the display of the liquid crystal display 5, however, the present invention is not limited thereto and similar effects can be obtained by providing a control means for displaying the numerical or literal information input by the input means on the display means, and then for subsequently showing the item corresponding to the input numerical or literal information and displaying the cursor on the position of the corresponding item.

Furthermore, while in the aforesaid embodiment, the present invention is applied to the portable telephone apparatus 1, the present invention is not limited thereto and similar effects can be obtained by displaying input numerical or literal information as described above as long as a portable communication apparatus having a display means for displaying a plurality of items and a cursor clearly showing which of the items is currently selected.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A portable communication apparatus having display means for displaying a telephone directory having a plurality of items and a cursor indicating which of said items is currently selected when said apparatus is in a telephone directory mode, said apparatus comprising:

input means for inputting alphanumerical information and for selecting said telephone directory mode in response to operations by a user; and control means for controlling said display means and for switching said apparatus to a short-cut mode from said telephone directory mode when an alphanumerical symbol is input by said user of said input means while said apparatus is in said telephone directory mode, said short-cut mode displaying said alphanumeric symbol indicating a location where said cursor will jump after a pre-determined period of time, and after said predetermined period of time has lapsed displaying an item corresponding to said location indicated by said alphanumeric symbol and displaying said cursor on said location.

2. The portable communication apparatus according to claim 1, further comprising a timer, wherein said control means activates said timer when said alphanumerical symbol is input by said user of said input means, accepts a subsequent alphanumerical symbol input while said timer is operating, and causes said display means to display said item corresponding to said alphanumerical symbol when said subsequent alphanumerical symbol is not input until after a timeout of said timer.

3. The portable communication apparatus according to claim 2, wherein said control means causes said display means to display information indicating that said apparatus is ready to accept said subsequent alphanumerical symbol.

4. The portable communication apparatus according to claim 1, wherein said portable communication apparatus is a portable telephone apparatus for communicating with a base station unit.

5. A communicating method using display means for displaying a telephone directory having a plurality of items and a cursor indicating which of said items is currently selected when in a telephone directory mode, said method comprising the steps of:

inputting alphanumerical information and selecting said telephone directory mode in response to operations by a user using input means; and controlling said display means and switching to a short-cut mode from said telephone directory mode when an alphanumerical symbol is input by said user of said input means while in said telephone directory mode, said short-cut mode displaying said alphanumeric symbol indicating a location where said cursor will jump after a pre-determined period of time, and after said predetermined period of time has elapsed displaying an item corresponding to said location indicated by said alphanumeric symbol and displaying said cursor on said location using control means.

6. The communicating method according to claim 5, wherein said control means activates a timer when said alphanumerical symbol is input by said user of said input means, accepts a subsequent alphanumerical symbol input while said timer is operating, and causes said display means to display said item corresponding to said alphanumerical symbol when said subsequent alphanumerical symbol is not input until after a timeout of said timer.

7. The communicating method according to claim 6, wherein said control means causes said display means to display information indicating a readiness to accept said subsequent alphanumerical symbol.

* * * * *